United States Patent [19]
Dorlini

[11] 4,191,391
[45] Mar. 4, 1980

[54] SHOPPING CART WITH AUXILIARY SLED ATTACHMENT

[76] Inventor: Peter J. Dorlini, 415 Gramatan Ave., Mt. Vernon, N.Y. 10552

[21] Appl. No.: 938,914

[22] Filed: Sep. 1, 1978

[51] Int. Cl.² .......................................... B62B 13/18
[52] U.S. Cl. .......................................... 280/9; 280/11
[58] Field of Search ............... 280/8, 9, 11, 47.26, 280/43.22

[56] References Cited

U.S. PATENT DOCUMENTS

| | | | |
|---|---|---|---|
| 2,425,107 | 8/1947 | Martin | 280/47.26 |
| 2,577,885 | 12/1951 | Gay | 280/43.22 |
| 3,851,891 | 12/1974 | Lin | 280/11 |
| 4,040,638 | 8/1977 | Flagg | 280/9 |

*Primary Examiner*—Robert R. Song
*Attorney, Agent, or Firm*—Cooper, Dunham, Clark, Griffin & Moran

[57] ABSTRACT

The present invention provides a shopping cart of the two-wheel variety wherein an auxiliary sled attachment is provided, said attachment being adapted to be moved from one to the other of two selectable positions and to be retained in either of such positions, said attachment consisting of a sled having a snow engaging surface which in one position will underlie the wheels, and in the other position will be held out of engagement with the sidewalk or street and in substantially parallel coincidence with a side of the cart.

8 Claims, 5 Drawing Figures

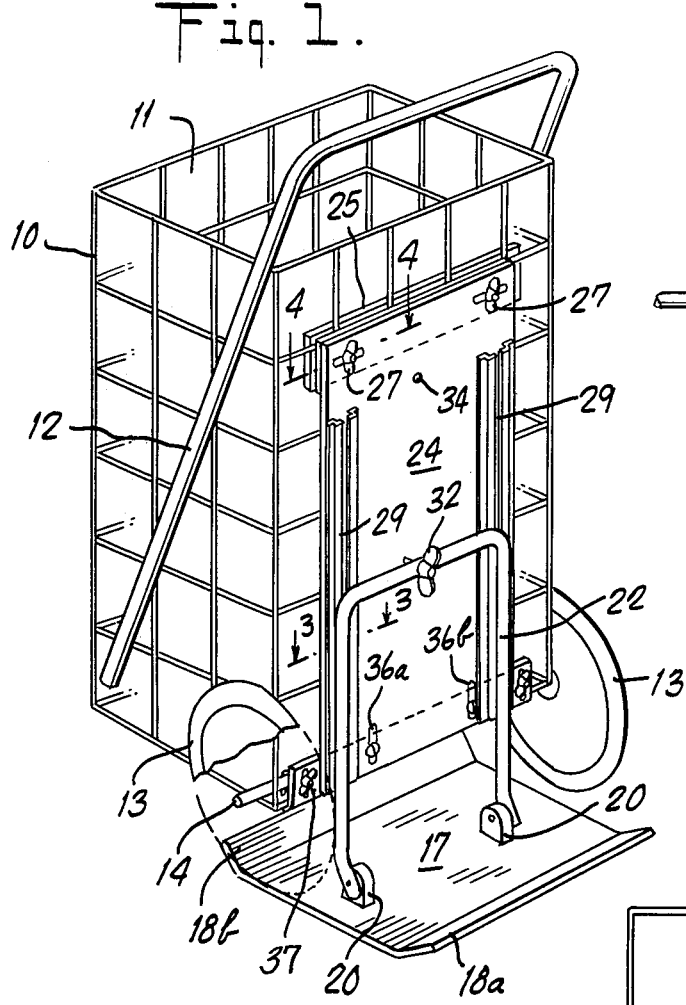
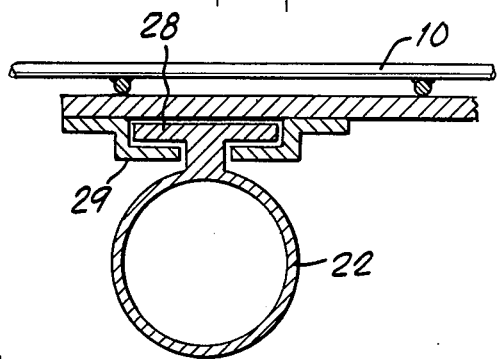
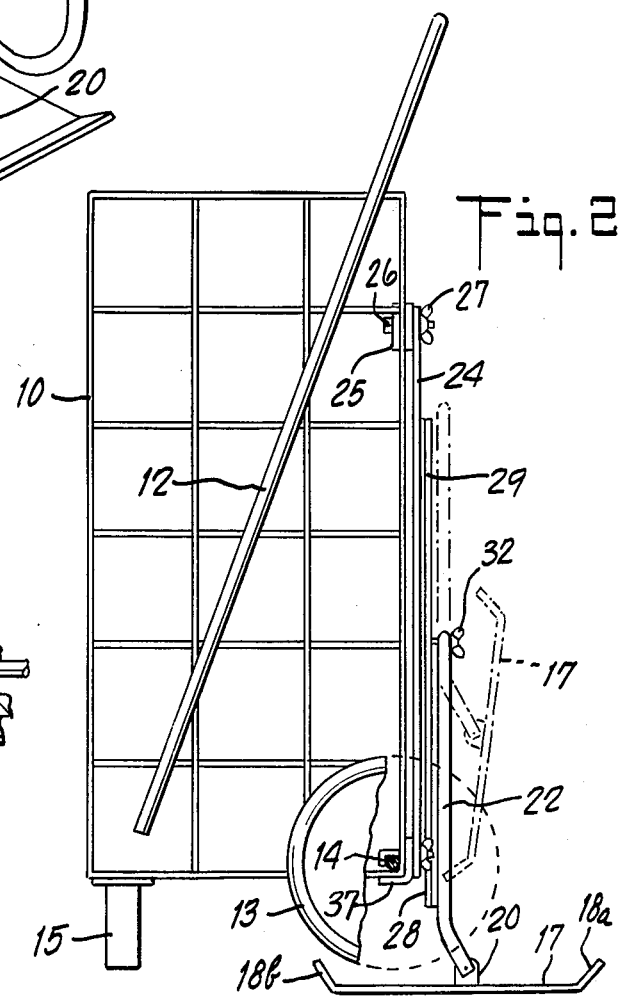

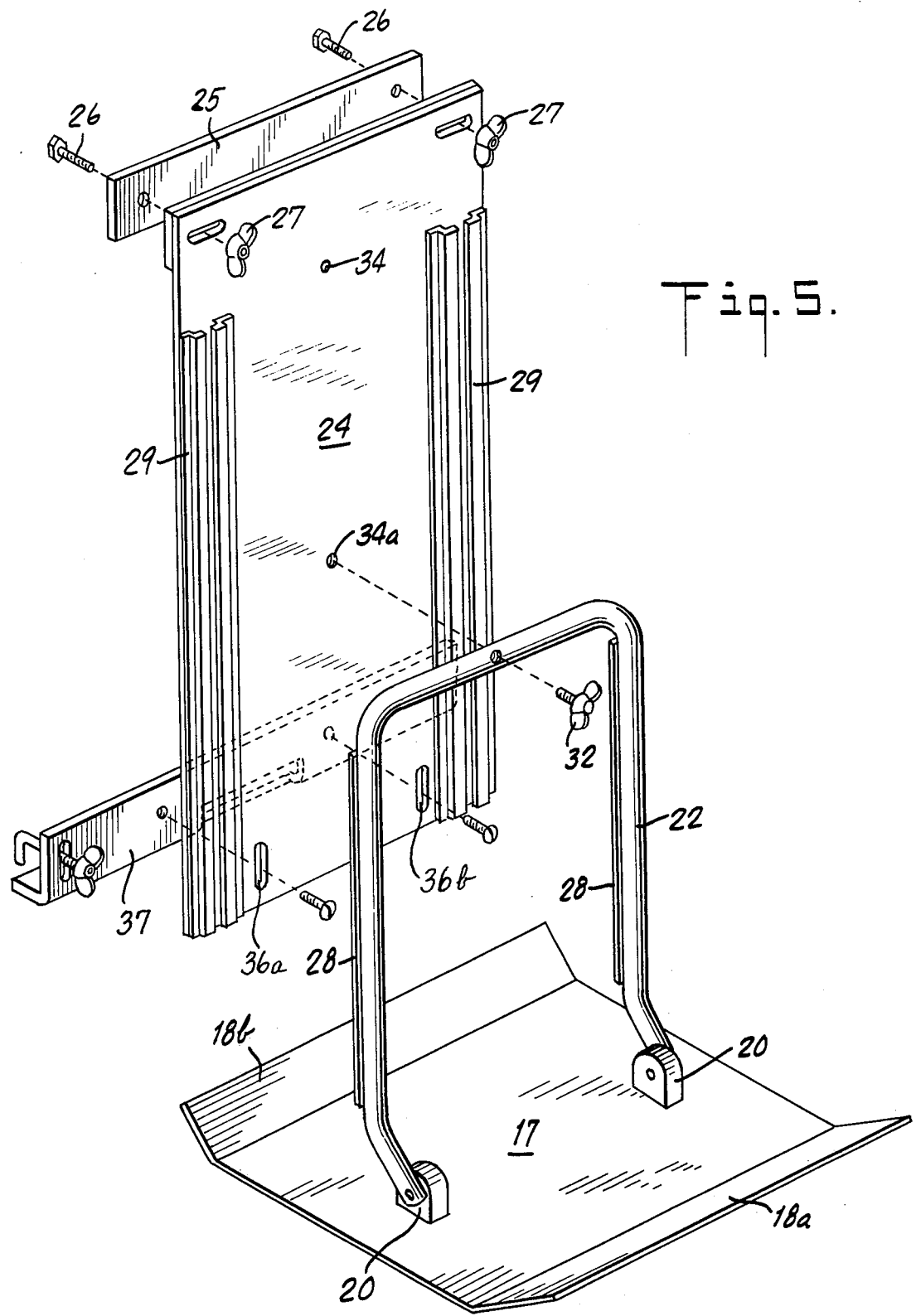

SHOPPING CART WITH AUXILIARY SLED ATTACHMENT

The present invention relates to shopping carts of the type which are usually privately owned and which are often used by senior citizens for transporting their grocery purchases from supermarkets and the like to their places of residence.

Such shopping carts usually consist of wire basket construction, open at its top, a pair of wheels at the rear of the cart for rolling along a sidewalk or street, a handle for the user in pulling or pushing the cart, and a rigid support at the forward end of the cart to provide a 3-point ground contact when it is desired to have the cart stand upright on its own while being loaded with grocery or other purchases.

One of the problems presented in the use of such shopping carts is that when snow or slush conditions prevail, it is very difficult to push or pull the cart with the two wheel structure, as the wheels do not easily ride over or slide on the snow; but, on the contrary, sometimes collect snow as they become embedded in the same due to the weight of groceries and the like in the cart.

It is the object of the present invention to provide a shopping cart of the type described which has an auxiliary sled attachment which may be moved into and out of sidewalk or street engagement under snow conditions so that the cart may slide over the snow instead of being embedded therein.

It is another object of the present invention to provide an auxiliary attachment for a two-wheel shopping cart of the type described which may be adapted to various types of carts instead of being supplied as original equipment with the cart.

More particularly, it is an object of the present invention to provide a two-wheel type of shopping cart having an auxiliary attachment of a sled which may be brought into and out of sidewalk and street engagement under snow conditions without removing or displacing the wheels.

Prior Art

Applicant's prior art search concerning the novelty of this invention brought to light the following U.S. Pat. Nos.:

1,714,902 — Croswell
1,958,312 — Potts et al.
2,137,860 — Stredronsky
2,425,107 — Martin
2,480,256 — Nurenberg et al.
2,624,588 — Jones
2,639,163 — Walker
2,926,923 — Browne
4,040,638 — Flagg It is applicant's position that none of these prior art patents solves the problem with which he is concerned, nor do they provide the device herein sought to be patented.

PRESENT INVENTION

The present invention provides a shopping cart of the two-wheel variety wherein an auxiliary sled attachment is provided, said attachment being adapted to be moved from one to the other of two selectable positions and to be retained in either of such positions, said attachment consisting of a sled having a snow engaging surface which in one position will underlie the wheels, and in the other position will be held out of engagement with the sidewalk or street and in substantially parallel coincidence with a side of the cart.

For a better understanding of the invention reference is now made to the accompanying drawings wherein:

FIG. 1 is a perspective view of a grocery cart or the like showing the auxiliary sled attachment applied to the back thereof;

FIG. 2 is a side elevational view of the grocery cart or the like shown in FIG. 1, with the sled attachment in its alternate position shown in phantom;

FIG. 3 is a detailed cross-sectional view taken along the line 3—3 in FIG. 1 and viewed in the direction of the arrows;

FIG. 4 is a fragmentary, detailed, cross-sectional view taken along the line 4—4 of FIG. 1 and viewed in the direction of the arrows; and FIG. 5 is an exploded view in perspective of the auxiliary sled device provided by the present invention for attachment to a grocery cart and the like.

Referring now more in detail to the accompanying drawings, it will be noted from FIG. 1 that the present invention pertains basically to a shopping cart consisting essentially of a wire frame basket 10 having an open top 11, a side frame 12 which serves as a handle, such side frame being generally of inverted U shape, and a pair of wheels 13 suitably supported by an axle 14. Normally such a cart has a forward support 15 as best seen in FIG. 2 which will support the cart in vertical position in cooperation with the wheels 13 for loading through the open top 11.

It will thus be understood that the basic shopping cart may be used for carrying groceries and the like from supermarkets merely by loading the groceries in the wire frame basket 10 and wheeling the basket type cart along sidewalks, streets and the like by relying upon the wheels 13 to facilitate the movement of the same.

As mentioned earlier, the foregoing type of grocery cart or the like in use presents problems under snow or slush conditions for the reason that the wheels 13 will not ride over snow or slush when the cart is loaded with groceries or the like; but on the contrary, the cart will be depressed into the snow or slush and, due to accumulation of snow or slush on the wheels, may become impossible or very difficult for the person pushing or pulling the cart to propel it along a sidewalk or street to his or her residence.

Hence, the present invention provides an auxiliary snow sled device for attachment to the rear end of a grocery cart or the like, which under snowy or slushy conditions can be brought into selective operation so that the cart will have a sled as its street or sidewalk contact instead of the wheels, the invention also providing selective means whereby the sled of the auxiliary device may be moved into or out of street or sidewalk engagement, depending upon whether snow or slush conditions exist.

As best illustrated in FIGS. 1 and 2 of the accompanying drawings, the present invention provides an auxiliary sled device for attachment to the rear end of a conventional two-wheel shopping cart. In its essentials such auxiliary sled device comprises a flat sled section 17 having upturned front and rear flanges 18a, 18b, having bearing blocks 20 to which the lower ends of an inverted U-frame 22 are pivotally attached.

Also at the rear end of the basket there is provided a supporting plate 24 which is mounted on the basket by a retaining bar 25 which engages the inside of the wire frame of the cart. The supporting plate as best seen in FIG. 4 is attached to the wire frame of the cart by a pair of screw-threaded bolts 26 and wing nuts 27 screw-threadedly attached to such bolts.

The support plate 24 has on each side a vertical slide 28 as best shown in FIG. 3 which is of T-shape in cross section and is attached to the U-frame 22. Each vertical slide 28 is engaged in a complemental track 29 as also best shown in FIG. 3, the slide and track serving to guide the U-frame 22 from the position shown in full lines in FIG. 1 when the sled is in contact with the sidewalk, street or the like, to the position shown in phantom in FIG. 2 when the sled is out of contact with the sidewalk, street or the like.

It will be noted that the inverted U-frame 22 is provided with a wing nut type of bolt 32 which is threaded through a hole in the inverted U-frame 22 and which also engages in a complemental hole in the support plate 24 for holding the sled element 17 in the position shown in FIG. 1. It will also be noted that a hole 34 is provided in the support plate for engagement by such wing nut bolt 32 when it is desired to hold the sled 17 out of operative position as shown in dotted lines in FIG. 2.

Thus, as best seen in FIGS. 1 and 2 the present invention provides a two-wheeled grocery or like cart, having an auxiliary sled attachment which may be moved between one of two selective positions, i.e., when in lowered position the sled is rigidly supported below the two wheels of the cart and serves as the traction means, and in its other position is rigidly retained out of sidewalk or street engaging position, so that the wheels of the cart serve as the traction means.

Instead of providing an original equipment a two-wheeled shopping cart with the auxiliary sled attachment as shown in FIGS. 1 and 2, the present invention also contemplates that the auxiliary sled and accompanying supporting structure can be provided for attachment to already existing shopping carts. FIG. 5 is an exploded view in perspective which shows the essential elements of such auxiliary sled device for attachment to two-wheeled shopping carts. In such exploded view it will be noted that the auxiliary sled device comprises the same basic elements of the support plate 24, the retaining bar 25, the screw-threaded bolts 26 and wing nuts 27, the vertical slide 28, the complemental track 29, the wing nut and bolt type lock 32, and the upper and lower holes 34 and 34a for engagement by the wing nut and bolt type of lock. It also includes the inverted U-frame 22, the sled section 17, the flanges 18a and 18b, and bearing blocks 20.

In FIG. 5 it will also be noted that at the lower end of the support plate 24 there are provided two vertical slots 36a and 36b in the right-angle bracket 37 for the axle 14. These vertical slots provide an adaptation means to accommodate the auxiliary sled attachment to two-wheeled shopping carts as supplied by various manufacturers having slightly differing dimensions from the cart illustrated in the accompanying drawings FIGS. 1 to 4, inclusive, wherein the preferred embodiment of the invention is shown and such auxiliary sled attachment forms part of such two-wheeled shopping cart as part of the original equipment.

What I claim is:

1. A shopping cart of basket-type construction having an open top for the reception of groceries and the like, a handle for pushing or pulling the same, and a pair of wheels at its bottom rear end for rolling ground engagement with a sidewalk, street and the like, characterized in that:
   (a) said shopping cart has an auxiliary sled attachment including a sled which is movable into and out of one of two selective positions, wherein in one of said positions the sled of such attachment is in ground engaging position, and in the other of said positions is in an inoperative, non-ground engaging position;
   (b) said auxiliary sled attachment has
     a support plate secured to the back of the cart,
     a slidably mounted inverted U-shape frame,
     vertically slidable means on said U-shape frame cooperating with complemental means on said support plate, and
     a pivotal connection between the free ends of the U-shape frame and said sled member, whereby said inverted U-shape frame may be moved upwardly and downwardly to bring said sled into and out of operative, ground engagement;
     and
   (c) means for retaining said sled in either of said selective positions.

2. A shopping cart of basket-type construction having an open top for the reception of groceries and the like, a handle for pushing or pulling the same, and a pair of wheels at its bottom rear end for rolling ground engagement with a sidewalk, street and the like, characterized in that:
   (a) said shopping cart has an auxiliary sled attachment including a sled which is movable into and out of one of two selective positions, wherein in one of said positions the sled of such attachment is in ground engaging position, and in the other of said positions is in an inoperative, non-ground engaging position;
   (b) means for retaining said sled in either of said selective positions;
   (c) a support plate secured to the back of the cart, said support plate having a pair of vertically disposed track members;
   (d) an inverted U-frame at its open end secured to said sled with said sled mounted for pivotal movement with respect to the same;
   (e) said inverted U-frame having complemental slide members engaged in said pair of tracks for raising and lowering the inverted U-frame relative to said support plate to bring said sled into and out of ground engaging position; and
   (f) said retaining means being provided on said support plate and said inverted U-frame for holding said sled in said selective positions.

3. A shopping cart according to claim 2, wherein:
   (g) said support plate has two vertically disposed screw-threaded holes;
   (h) said inverted U-frame in its crossbar has a through hole in vertical alignment with said screw-threaded holes in said support plate; and
   (i) a screw-threaded wing nut for screw-threaded engagement in said screw-threaded holes in said support plate and crossbar, to hold said sled in one or the other of said selective positions.

4. A shopping cart according to claim 3, wherein a retaining bar is contained within the basket adjacent the upper end of the support plate, for removable screw-threaded attachment to said basket and support plate.

5. A shopping cart according to claim 3, wherein a retaining bar is contained within the basket adjacent the upper end of the support plate, for removable screw-threaded attachment to said basket and support plate, and an angled bar constituting part of the axle support for the wheels is also screw-threadedly attached to the bottom of said support plate.

6. A sled attachment for a shopping cart and the like, which consists essentially of a basket having an open top for the reception of groceries and the like, a handle for pushing or pulling the same, and a pair of wheels at its bottom rear end for rolling engagement with a sidewalk, street and the like, characterized in that said sled attachment has:

(a) a support plate for attachment to the back of such cart;

(b) a sled supported by said support plate and vertically slidable with respect thereto to occupy one of two selective positions, the sled in one of such positions being in ground engaging position, and in the other of said positions being in an inoperative, nonground engaging position;

(c) an inverted U-frame at its open end secured to said sled;

(d) a pair of vertically disposed track members in said support plate;

(e) vertically slidable means on said U-shape frame cooperating with the track members on said support plate; and (f) a pivotal connection between the free ends of the U-shape frame and said sled member, whereby said inverted U-shape frame may be moved upwardly and downwardly to bring said sled into and out of operative, ground engagement.

7. A sled attachment for a shopping cart and the like, according to claim 6, wherein a retaining bar is provided for retainment within the basket adjacent the upper end of the support plate, for removable screw-threaded attachment to said basket and support plate.

8. A sled attachment according to claim 6, wherein:

(g) said support plate has two vertically disposed screw-threaded holes;

(h) said inverted U-frame in its crossbar has a through hole in vertical alignment with said screw-threaded holes in said support plate; and (i) a screw-threaded wing nut is provided for screw-threaded engagement in said screw-threaded holes in said support plate and crossbar, to hold said sled in one or the other of said selective positions.

* * * * *